United States Patent [19]

Coe

[11] 4,286,073
[45] Aug. 25, 1981

[54] URETHANE CATALYSIS

[75] Inventor: Charles G. Coe, Macungie, Pa.

[73] Assignee: Air Products and Chemicals, Inc., Allentown, Pa.

[21] Appl. No.: 172,892

[22] Filed: Jul. 28, 1980

[51] Int. Cl.³ .............................................. C08G 18/14
[52] U.S. Cl. .................................. 521/126; 252/431 R
[58] Field of Search ............. 521/126; 252/182, 431 R

[56]  References Cited

U.S. PATENT DOCUMENTS

| 3,392,128 | 7/1968 | Hostettler et al. | 260/22 |
|---|---|---|---|
| 3,392,153 | 7/1968 | Hostettler et al. | 521/126 |
| 3,582,501 | 6/1971 | Hostettler et al. | 260/2.5 |
| 3,706,687 | 12/1972 | Rudyki | 521/126 |
| 3,836,488 | 9/1974 | Pruitt et al. | 260/2.5 AC |
| 3,980,579 | 9/1976 | Syrop et al. | 252/182 |
| 4,032,468 | 6/1977 | Treadwell et al. | 252/182 |
| 4,043,949 | 8/1977 | Treadwell et al. | 260/2.5 AC |
| 4,119,585 | 10/1978 | Kenney et al. | 521/118 |

Primary Examiner—Maurice J. Welsh
Attorney, Agent, or Firm—Richard A. Dannells, Jr.; James C. Simmons; E. Eugene Innis

[57] ABSTRACT

Hydrolytically stable premix compositions for preparation of urethane foams are prepared by employing as the organotin catalyst in such premix composition a di- or tri-alkyltin sulfonate corresponding to the formula

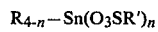

$$R_{4-n}-Sn(O_3SR')_n$$

wherein R is an alkyl radical of 1 to 8 carbon atoms; R' is an alkyl, phenyl, or alkyl phenyl radical of 1 to 8 carbon atoms and n is 1 or 2. Examples include: dibutyltin bis-methanesulfonate, dibutyltin bis-benzenesulfonate, dimethyltin bis-benzenesulfonate, dimethyltin bis-benzenesulfonate, dioctyltin bis-methanesulfonate and dibutyltin bis-toluenesulfonate.

12 Claims, No Drawings

URETHANE CATALYSIS

TECHNICAL FIELD

The present invention relates to the preparation of polyurethane foams and is particularly concerned with the use of certain hydrolytically-stable catalysts in pre-mix composition for such foams.

BACKGROUND OF THE INVENTION

The preparation of cellular polyurethanes by reacting organic isocyanates with polyols containing reactive hydrogen atoms, as determined by the Zerewitinoff reaction, is well-known in the art. These reactions are conventionally carried out in the presence of tertiary amine catalysts or organo-tin catalysts or mixtures of these.

In known formulations particularly for the preparation of flexible polyurethane foams, water is included in the formulation for reaction with part of the isocyanate thereby releasing carbon dioxide gas which acts as a blowing agent. The blowing reaction is promoted by the presence of tertiary amine catalyst. A tin catalyst is also included in the formulation to promote the isocyanate-polyol reaction. Typical various organotin compounds employed or proposed for use as catalysts or co-catalysts in urethane-forming reactions are disclosed, for example, in U.S. Pat. Nos. 3,582,501; 3,836,488; 4,119,585. U.S. Pat. No. 3,392,128 discloses the use of dibutyltin sulfonamide and U.S. Pat. No. 3,980,579 discloses a number of dialkyltin thio carboxylates.

One of the problems encountered in the use of organotin compounds previously employed in polyurethane formulations, is that these organotin compounds hydrolyze in the presence of water with resulting loss in catalytic activity. The problem is particularly evident in commercial formulations wherein a pre-mix composition is prepared and stored, including all of the components except for the isocyanate which is later added to effect the desired polyurethane reaction. This problem has been recognized in U.S. Pat. Nos. 4,032,468 and 4,043,949 wherein the use of certain organotin compounds are proposed which are claimed to be stable against hydrolysis. These patents disclose triorganotin compounds such as methyl or methoxymethyl tin halides and oxides; and certain methyl, allyl, phenyl or benzyl tin compounds in the form of their halides, carboxylates, sulfides, mercaptides, dithiocarbamates or mercaptocarboxylates.

SUMMARY OF THE INVENTION

It has now been found, in accordance with the present invention that di- and trialkyl organotin sulfonates are hydrolytically stable and can be employed as catalysts in water-containing premix compositions for the preparation of polyurethane foams.

DETAILED DESCRIPTION

The organotin compounds employed as polyurethane catalysts in accordance with the invention correspond to the general formula $$R_{4-n}-Sn(O_3SR')_n \quad (I)$$

wherein R is an alkyl radical of 1 to 8 carbon atoms, R' is an alkyl, phenyl or alkyl phenyl radical of 1 to 8 carbon atoms and n is 1 or 2. Preferred compounds include:

dibutyltin bis-methanesulfonate,
dibutyltin bis-benzenesulfonate,
dimethyltin bis-benzenesulfonate,
dioctyltin bis-methanesulfonate,
dibutyltin bis-toluenesulfonate,
tributyltin toluenesulfonate
tributyltin methanesulfonate.

Compounds of the type corresponding to the above formula have been described in the literature but their hydrolytic stability has not been previously noted nor their utilization as catalysts for the urethane reaction previously disclosed.

These di- and tri alkyl tin sulfonates can be prepared in high yield (95%) by the reaction of a dialkyl or trialkyltin oxide with the appropriate organic sulfonic acid in a refluxing hydrocarbon solvent, the water of reaction being removed by azeotropic distillation. Methods for such preparation are described by P. G. Harrison et al in Journal of Organometallic Chemistry, 114 (1976) at pages 47-52.

Except for the particular organotin catalyst employed, the two-part polyurethane foam-forming compositions may be comprised of the usual components heretofore employed. Thus the premix (a) may contain the polyol, cell stabilizer, amine catalyst and organotin catalysts, and water, and (b) the polyisocyanate composition maintained separately for admixture therewith when the polyurethane reaction is to be carried out.

To test the stability of the proposed di- and tri-alkyltin sulfonates, samples of these were refluxed in a 10% water/ethanol solution for 18 hours and recovered quantitatively. Analysis of the refluxed product confirmed that no chemical change in the organotin had occurred. Certain of the samples have been kept in solutions for longer than a month with no evidence of hydrolysis. Other known organotin polyurethane catalysts in contrast to the di- and tri-alkyltin sulfonates, are slowly hydrolyzed in the presence of water. Further, these particular catalysts are stable in a premix containing quaternary amines of all types which are used in formulations to promote a delayed cream time but do not effect the overall cure time of the system.

EXAMPLE 1

To evaluate the activity of alkyltin sulfonates as co-catalysts with typical commercial tertiary amine catalysts a series of screening tests were performed. Flexible foams were prepared from formulations containing an alkyltin sulfonate of the invention and compared to similar formulations containing a typical commercial organotin catalyst (stannous octoate). The formulation comprised:

| Components | Parts (by weight) |
| --- | --- |
| Voranol CP-3010[1] | 100 |
| DC-190[2] | 1.2 |
| Water | 3.5 |
| DABCO 33LV[3] | 0.45 |
|  | (0.15 active) |
| Hylene TM (80/20) 105 Index[4] | 44.6 |

-continued

| Components | Parts (by weight) |
|---|---|
| Organotin co-catalyst | As indicated |

NOTES:
(1)Polyol based on propylene oxide having an OH⁻ No. of 55-58 (Dow Chemical Co.).
(2)Silicone surfactant (Dow-Corning)
(3)33% solution of triethylenediamine in dipropylene glycol (Air Products & Chemicals, Inc.)
(4)Mixture of 2,4- and 2,6-isomers of toluene diisocyanate The results are reported in Table 1 below:

TABLE 1

| Catalyst | 50% Stannous octoate in DOP | 26% dibutyl tin methanesulfonate in ethylene glycol | |
|---|---|---|---|
| Concentration | 0.5(0.25 active) | 0.5 (0.13 active) | 0.25 (0.065 active) |
| Cream time (secs.) | 8 | 11 | 10 |
| Hard gel (secs.) | 85 | 103 | 104 |
| Rise time (secs.) | 105 | 117 | 113 |

The data in Table 1 indicates that dibutyltin bis-methanesulfonate has catalytic activity comparable to the stannous octoate commonly employed in commercial polyurethane foam formulations. Even at ¼ to ½ the amount of the organotin complex comparable activity is observed. These catalysts of the present invention have a considerably larger molecular weight; therefore, the inherent activity of the metal is even greater. It should be noted that these runs were performed by adding the organotin catalyst at the time of mixing before the addition of the isocyanate. Even during this short period the stannous octoate of the prior art systems may be partially deactivated by the water present in the formulation. The physical appearance of the experimental foams with respect to shrinkage, open cells and foam cell appearance were comparable to those obtained with the control catalyst compositions. At the low level of tertiary amine catalyst employed, it would be impossible to produce a foam if the organotin co-catalyst was inactive.

EXAMPLE 2

Employing the same formulation as in Example 1, dibutyltin bis-toluenesulfonate (DBTTS) was evaluated, using a solution of this catalyst in dimethylformamide. A portion of this catalyst solution was diluted with 10% water and aged at room temperature for three weeks. From the results reported in Table 2, it is seen that no apparent change in activity occurred in the aged sample. Addition of water to a stannous octoate solution, on the other hand, produces an immediate precipitate of dibutyltin oxide which is relatively inactive as a co-catalyst for urethane production.

TABLE 2

| Catalyst | 1<br>50% Stannous Octoate in DOP | 2<br>17% DBTTS in DMF | 3<br>15.3% DBTTS in DMF/H₂O after 3 weeks |
|---|---|---|---|
| Concentration | 0.50 (0.85 active) | 1.0 (0.17 active) | 1.0 (0.15 active) |
| Cream time (secs.) | 9 | 10 | 11 |
| Hard gel (secs.) | 85 | 106 | 109 |
| Rise time (secs.) | 105 | 105 | 111 |

EXAMPLE 3

The organotin catalysts of the invention find particular use in urethane foam applications where an amine salt or quaternary compound is used as the primary catalyst. These systems are generally employed to produce delayed initiation and gel but do not effect the overall rise time allowing the formulation to completely fill a mold before curing occurs. This example illustrates a practical high density rigid formulation for a premix composition employing an amine salt and organotin sulfonate. Its superior activity at a lower concentration is indicative of an improved delayed action system. The formulation comprised:

| Components | Parts (by weight) |
|---|---|
| Voranol RH 360(1) | 100 |
| DC-193(2) | 1.0 |
| Water | 0.5 |
| Catalyst | As indicated |
| PAPI 135(3) | 98 |

NOTES:
(1)Polyol having an OH⁻ No. of 350 to 370 (Dow Chemical Co.)
(2)Silicone surfactant (Dow-Corning Co.)
(3)Polymethylene polyphenyldiisocyanate with high functionality having an isocyanate equivalent of about 2.7.

The results are reported in Table 3 below.

TABLE 3

| Catalyst | 28% triethylenediamine 32% N,N-dimethylethanolamine 40% diethyleneglycol | 9.2% dibutyltin methane sulfonate 32.3% 2:1 salt of triethylenediamine with hydroxyethyliminodiacetic acid 31% ethylene glycol 27.5% diethylene glycol | |
|---|---|---|---|
| Concentration (parts by weight) | 1.0 | 0.2 | 0.5 |
| RESULTS: | | | |
| Initiation (secs.) | 48 | 97 | 78 |
| Gel time (secs.) | 110 | 163 | 125 |
| Tack-free (secs.) | 156 | 195 | 140 |
| Rise time (secs.) | 177 | 224 | 171 |

Although no practical formulations currently exist it is expected that these organotinsulfonates would be excellent catalysts when combind with quaternary amines. In these systems the proposed tin catalysts being stable to water, can be employed in water-containing premix compositions and the premix stored for reasonable time periods as required, without significant loss in catalyst activity. In the case of compositions employing the free tertiary amine catalyst, the organotin sulfonate will form an adduct with the amine on storage, with accompanying loss of activity. These organotin compounds of the invention can be used with free tertiary amine catalysts but only when the resulting mixtures of these are used shortly after being freshly prepared.

Generally neutral salts formed by reaction of a tertiary amine with a carboxylic acid or an anhydride can be employed in this invention. Among the preferred amine salts and quaternary ammonium type polyurethane catalysts suitable for inclusion in these formulations with the organotin sulfonate catalysts are:
(1) carboxylic acid salts of triethylenediamine
(2) carboxylic acid salts of N,N-dimethylpiperazine (3) N,N,N-trimethyl-N-2-hydroxypropylammonium acetate or other carboxylic acid (4) N,N,N-trimethyl-N-2-hydroxypropyl ammonium acetate or other carboxcyclic acid Any of the usual polyisocyanates generally employed in the preparation of polyurethane foams may be used in the practice of the present invention. The polyisocyanate contains at least two isocyanate groups per molecule such as toluene diisocyanate (TDI). It is generally advantageous to employ an undistilled mixture of a technical grade of TDI. Any of the other conventionally employed polyisocyanates such as diisocyanatodiphenylmethane, condensation products providing a plurality of phenyl groups and a plurality of isocyanato groups, hexamethylenediisocyanate, chlorophenyldiisocyanate, bromophenyldiisocyanate, tetraisocyanatodiphenylmethane, and the like may be used.

Likewise, any of the polyols containing reactive hydrogen atoms generally employed in the production of polyurethane foams may be employed in the formulations of the present invention. The polyol contains at least two alkanol groups per molecule. Suitable examples include polyethylene glycol, polypropylene glycol, a linear polyester such as glycolterphthalate, glycolsuccinate, tetramethyleneglycol adipate or other hydroxy terminated linear ester. Also the polyol may be glycerol, a polyethylene ether derivative of glycerol, erythritol, pentaerythritol, manitol, sorbitol, a-methyl glucoside and sucrose. The polyol may be a poly(oxyalkylene)polyol derived from a polyamine such as ethylenediamine or a polyalkylene oxide derivative of a starch. Mixtures of the polyols are satisfactory.

What is claimed is:

1. Stable pre-mix compositions reactable with organic isocyanates for preparation of polyurethane foams, said compositions comprising an active hydrogen-containing compound as determined by the Zerewitinoff reaction, water and an organotin catalyst, said catalyst being hydrolytically stable and corresponding to the general formula $$R_{4-n}-Sn(O_3SR')_n$$

wherein R is an alkyl radical of 1 to 8 carbon atoms, R' is an alkyl, phenyl or alkyl phenyl radical of 1 to 8 carbon atoms and n is 1 or 2.

2. Compositions as defined in claim 1 further comprising an amine catalyst active in promoting water-isocyanate reactions, said amine catalyst being selected from the group consisting of tertiary amine salts and quaternary ammonium derivatives of tertiary amines.

3. Compositions as defined in claim 1 or 2 wherein said organotin compound is dibutyltin bis-methanesulfonate.

4. Composition as defined in claim 1 or 2 wherein said organotin compound is dibutyltin bis-toluenesulfonate.

5. In the method of producing polyurethane foam by reacting a polyisocyanate with a premix composition comprising water, hydroxy terminated polyol and catalytic amounts of organotin catalyst, and amine catalyst the improvement which comprises the use in said premix composition of a hydrolytically stable organotin catalyst corresponding to the general formula $$R_{4-n}-Sn(O_3SR')_n$$

wherein R is an alkyl radical of 1 to 8 carbon atoms, R' is an alkyl, phenyl or alkyl phenyl radical of 1 to 8 carbon atoms and n is 1 or 2.

6. The improvement as defined in claim 5 wherein said organotin catalyst is dibutyltin bis-methanesulfonate.

7. The improvement as defined in claim 5 wherein said organotin catalyst is dibutyltin bis-toluenesulfonate.

8. The method as defined in claims 5,6 or 7 wherein said amine catalyst is in the form of a salt of a tertiary amine.

9. The method as defined in claim 8 wherein said amine catalyst is a formic acid salt of triethylenediamine.

10. The method as defined in claim 8 wherein said amine catalyst is a hydroxyethyliminodiacetic acid salt of triethylenediamine.

11. The method as defined in claims 5, 6 or 7 wherein said amine catalyst is a quaternary ammonium derivative of a tertiary amine.

12. The method as defined in claim 11 wherein said amine catalyst is N,N,N-trimethyl-N-2-hydroxypropyl ammonium acetate.

* * * * *